UNITED STATES PATENT OFFICE.

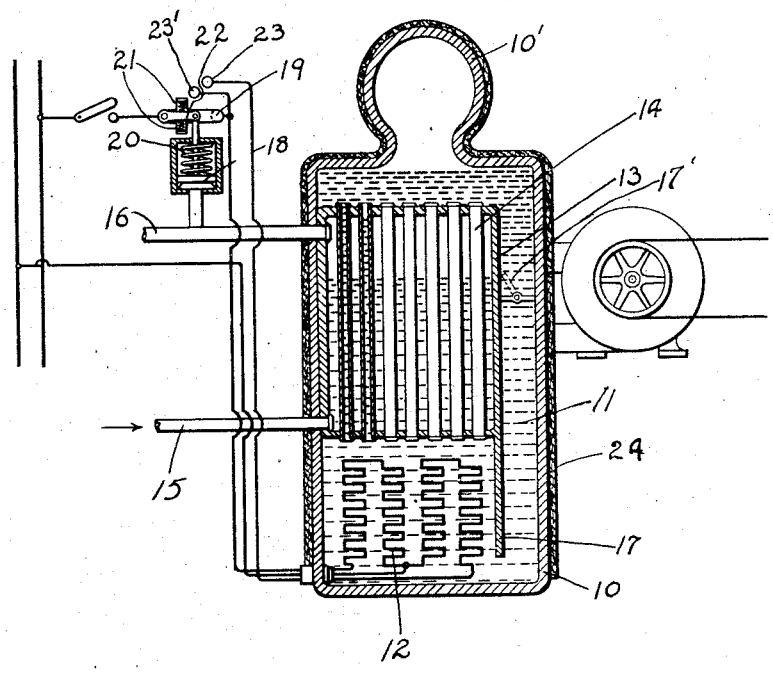

ELIHU THOMSON, OF SWAMPSCOTT, MASSACHUSETTS, ASSIGNOR TO GENERAL ELECTRIC COMPANY, A CORPORATION OF NEW YORK.

ELECTRIC HEATER.

No. 884,540.  Specification of Letters Patent.  Patented April 14, 1908.

Application filed October 13, 1906. Serial No. 338,711.

*To all whom it may concern:*

Be it known that I, ELIHU THOMSON, a citizen of the United States, residing at Swampscott, county of Essex, State of Massachusetts, have invented certain new and useful Improvements in Electric Heaters, of which the following is a specification.

This invention relates to electric heaters, and has for its object the provision of means whereby the energy of an electric current may be transformed into heat in a reliable and efficient manner.

One of the objects of my invention is to produce an electric heater which may be used with comparatively high potentials. In order to bring about this result, I immerse the heating resistance in a fluid, such for instance as oil, having a high flashing point. In order to carry the heat rapidly, and thus keep the size of the heater within convenient proportions, and at the same time have sufficient fluid for the necessary insulation, I provide means for circulating the fluid.

The device to be heated is arranged within the fluid receptacle, so that it will be heated by the circulating fluid. The heating device may be a tubular heater arranged to distribute steam or hot water, the whole constituting a boiler having two circulating systems, one being oil circulated by means of a pump, and the other being water or vapor circulated by gravity or in any other well known manner. I also provide means whereby the temperature may be regulated as, for instance, by cutting out sections of the resistance, as the temperature rises or the steam pressure increases.

Further features of my invention will appear in the course of the following specification, in which I have shown one form of my invention.

Referring to the drawing, 10 is a casing preferably of metal cast into a desired form, although the particular design or method of making the same, forms no part of my invention. I have shown for purpose of illustration a rectangular water-tight casing having an expansion chamber 10', which I fill with insulating fluid 11, such for instance as oil, having a high-flashing point. The heating resistance 12 is mounted in the casing and immersed in the oil. This resistance may be of any desired type, such for instance as a cast-grid, or a resistance-conductor of any kind. Secured within the casing is a heat distributing device, comprising a second water-tight casing 13, provided with tubes 14, constituting a tubular boiler, in which the fluid to be heated circulates around the tubes while the heating medium, in this case the oil, circulates through the tubes. The tubes 15 and 16 furnish respectively an inlet or outlet to the boiler for distributing the hot water or the steam produced in the boiler. One side of the boiler casing 17 is projected downward, so as to cause the liquid to pass to the bottom of the casing as it circulates, and thereby insure that the liquid circulates around the heating resistance.

As a means for circulating the oil or other insulating fluid, I provide a circulating pump in this case, one of the centrifugal type, although any other form of circulating means may be used without departing from the spirit of my invention. I also provide a valve or damper 17' between the inlet and outlet passage of the pump so as to force the oil to pass through the pump. I use a valve instead of a permanent separating wall so that the heater may be used without the pump if desired, the oil circulating through the tubes by natural circulation.

In order to provide means for regulating the temperature of the heater, I have shown a switch or cut-out controlled by the pressure of steam in the pipe 16, consisting simply of a cylinder having a plunger 18, acted upon to move the switch 19 against the tension of the spring 20. The switch is designed to give a quick break, so that it will not be too sensitive. This I accomplish by having springs 21 between the switch arm 19 and the arm 22, upon which the piston rod acts. This particular form of switch I have shown simply for purposes of illustration. The type of switch will of course depend upon the voltage used and upon other considerations which form no part of my invention. Where very high voltages are used, for instance, it is necessary to have a switch of special construction, while the switch that I have shown is adapted for lower voltages. By this construction, a definite pressure must be placed upon the spring before the switch will operate. I have shown the resistance as divided into two sections, in such a manner that the switch arm 19 in the position shown above connects only one section in circuit, while if the contact arm is moved so as to bridge the contacts 23 and 23', both sections will be in circuit, thereby increasing the temperature within the heater. The casing is preferably lagged with asbestos 24, or the like, so as to prevent the escape of heat.

It will be seen that I have provided a very compact and efficient heater, which can be used on high potentials, say for instance, 10,000 or 20,000 volts, and is likewise adapted for use with very much lower potentials. The oil makes a very efficient insulation and the heat is carried away rapidly as a column of hot oil is displaced by convection and a colder body of oil comes in contact with the resistance continuously. The oil circulates through the tubes of the heater although it is within the scope of my invention to have the liquid circulate around the tubes instead of through them. The positive circulation by the means of the pump, forms a very important part of my invention for it greatly reduces the size of the heater for a given capacity, and increases its efficiency. Very little heat is lost during the transformation, since the casing is jacketed and the oil is kept in circulation. It will be understood of course that I do not limit my invention to the particular construction or arrangement of parts herein shown and described, but what I have shown is merely for purposes of illustration, since many changes and modifications will suggest themselves to those skilled in the art without departing from the spirit of my invention, the scope of which is set forth in the annexed claims.

What I claim as new and desire to secure by Letters Patent of the United States, is,—

1. An electric heater comprising a fluid container and means for circulating the fluid, a resistance conductor immersed in the fluid, and a heat distributing system receiving its heat from the fluid.

2. An electric heater comprising a fluid container and means whereby the fluid is caused to circulate, a resistance conductor immersed in the fluid, and a tubular heating device within the container and heated by the fluid.

3. An electric heater comprising a receptacle containing an insulating fluid and means for circulating the fluid, a resistance conductor immersed in the fluid, and a heat distributing system arranged to receive its heat from the circulating fluid.

4. An electric heater comprising a receptacle containing an insulating fluid and means for circulating the same, a resistance conductor immersed in the fluid, and a tubular heating device within the container adapted to be heated by the circulation of the fluid.

5. An electric heater comprising a receptacle, containing oil having a high flashing point and means for circulating the same, a resistance conductor immersed in the oil and adapted to heat the same, and a heating system partially within the container and arranged to receive its heat from the circulating oil.

6. An electric heater comprising a receptacle containing oil having a high flashing point and means for circulating the same, a resistance conductor immersed in the oil and adapted to heat the same, and a tubular heating device within the container for heating a heat distributing medium.

7. An electric heater comprising a fluid container and means for circulating the fluid, a resistance conductor immersed in the fluid, a heat distributing device within the container, and means controlled by said device for varying the resistance.

8. An electric heater comprising a receptacle, an insulating fluid and means for circulating the fluid, a heating resistance immersed in the fluid, a heat distributing device within the receptacle, and means controlled by said device for varying said resistance.

9. An electric heater comprising a receptacle containing oil having a high flashing point, means for circulating the same, a heating resistance immersed in the oil and adapted to heat the same, a tubular heater within the container, and means controlled thereby for varying the heating resistance.

In witness whereof, I have hereunto set my hand this twenty-fifth day of September, 1906.

ELIHU THOMSON.

Witnesses:
JOHN A. MCMANUS, Jr.,
HENRY O. WESTENDARP.